United States Patent [19]

Metcalf et al.

[11] Patent Number: 4,730,788
[45] Date of Patent: Mar. 15, 1988

[54] REACTION COUPLED, TORQUE BALANCED GEARTRAIN

[75] Inventors: Jeffrey D. Metcalf; David J. Lang, both of Rockford, Ill.

[73] Assignee: Sundstrand Corporation, Rockford, Ill.

[21] Appl. No.: 775,663

[22] Filed: Sep. 13, 1985

[51] Int. Cl.[4] .............................................. B64C 25/50
[52] U.S. Cl. ...................................... 244/50; 74/410; 74/750 R; 74/665 R
[58] Field of Search ............................. 244/100 R, 50; 74/750 R, 410, 664, 665 R, 665 G, 665 P, 665 B, 674, 769, 768; 280/96

[56] References Cited

U.S. PATENT DOCUMENTS

| | | | |
|---|---|---|---|
| 2,756,949 | 7/1956 | Smith . | |
| 2,972,907 | 2/1961 | Bullard, III | 74/750 R |
| 3,088,334 | 5/1963 | Richardson | 74/664 |
| 3,115,791 | 12/1963 | Dean | 74/750 R |
| 3,144,790 | 8/1964 | Davis, Jr. et al. | 74/410 |
| 3,338,109 | 8/1967 | Forsyth et al. | 74/410 |
| 3,352,172 | 11/1967 | Teichmann | 74/410 |
| 3,391,580 | 7/1968 | Stadler | 244/50 |
| 3,874,518 | 4/1975 | Bates . | |
| 4,312,244 | 1/1982 | Barnes et al. | 74/410 |
| 4,458,546 | 7/1984 | Schreiner et al. . | |

*Primary Examiner*—Galen Barefoot
*Attorney, Agent, or Firm*—Wood, Dalton, Phillips, Mason & Rowe

[57] ABSTRACT

The present invention is a multipath power transmission for use in an aircraft nosewheel steering system. Two planetary gear sets, together providing the power to steer the nosewheel, have their ring gears externally meshed to balance the power delivered by each of the planetary gear sets. As a result, each planetary gear set must only be sized for fifty percent of the rated load, thereby minimizing weight and size, both of which are critical in an aircraft.

6 Claims, 3 Drawing Figures

REACTION COUPLED, TORQUE BALANCED GEARTRAIN

FIELD OF THE INVENTION

This invention relates generally to an aircraft nosewheel steering system and more particularly to an aircraft nosewheel steering system having a reaction coupled, torque balanced geartrain.

BACKGROUND OF THE INVENTION

In designing components for an aircraft, safety is of the utmost importance. At the same time, consideration must be given to the size and weight of any components used. Any savings realized in size and weight can improve overall efficiency of the aircraft.

Prior art nosewheel steering systems have utilized multiple path power transmissions, driven by a single power source, to steer the nosewheel of the aircraft. Each path in the power transmission might consist of a separate geartrain.

As a result of inherent manufacturing deficiencies, the separate geartrains may not divide the power delivered to the load equally. It is possible that one of the geartrains would deliver, for example, sixty percent of the power to the load while the other geartrain would delivery forty percent of the power to the load. Consequently, each of the two geartrains must be sized to accommodate the sixty percent power requirement to avoid the possibility of failure due to overloading. The net result of this is a heavier and larger power transmission than would be required if equal power delivery could be achieved. This result is obviously undesirable.

The present invention is directed to overcoming one or more of the problems as set forth above.

SUMMARY OF THE INVENTION

It is an object of this invention to provide a multipath power transmission that will balance the power transmitted by each path to a load. By providing a balanced power transmission, the components used can be sized to minimize dimensions and weight, thereby improving overall efficiency.

Specifically, a multipath power transmission provides power to a load from a source of input power. An input gear is coupled to the source of input power. The multipath power transmission includes first and second geartrains disposed in side-by-side relationship, with each of the first and second geartrains being used to interconnect the input gear and a load to be driven. The first and second geartrains are driven by the input gear, and in turn are used to transmit power to drive the load. Means are also included for interconnecting the first and second geartrains to equalize the power provided to the load by each of the first and second geartrain.

In a dual path transmission, as above, each of the first and second geartrains are sized to each handle fifty percent of the rated load. Where size and weight are critical, this improvement is invaluable over a power transmission having dual geartrains each sized to handle, for example, sixty percent of the rated load.

A preferred application for this invention is in an aircraft nosewheel steering system. In this example, the multipath power transmission provides the power to steer the nosewheel. In an aircraft, physical space is at a premium, and any savings in weight will improve the efficiency of the aircraft, particularly with regard to fuel consumption and/or useful load characteristics.

In the preferred embodiment, the multipath power transmission of the present invention has a first and a second planetary gear set with an output pinion coupled to the planet gears of each of the first and second planetary gear sets. The output pinions are in turn meshed to a nosewheel gear to in turn steer the nosewheel. The first and second planetary gear sets will each have their respective ring gears movably but resistably coupled to one another to equalize the power provided by each planetary gear to steer the nosewheel.

Upon receiving a command to turn the nosewheel the respective ring gears will initially rotate when input torque is applied. After manufacturing errors are compensated for the output torque of each ring gear becomes equal. Subsequently, the ring gears will become fixed and the output pinions will turn causing the nosewheel to turn, with each output pinion delivering fifty percent of the rated power to the nosewheel gear.

These and other features of the present invention will be more readily apparent with reference to the drawings and specification.

DESCRIPTION OF THE PREFERRED EMBODIMENT

Figure 1:
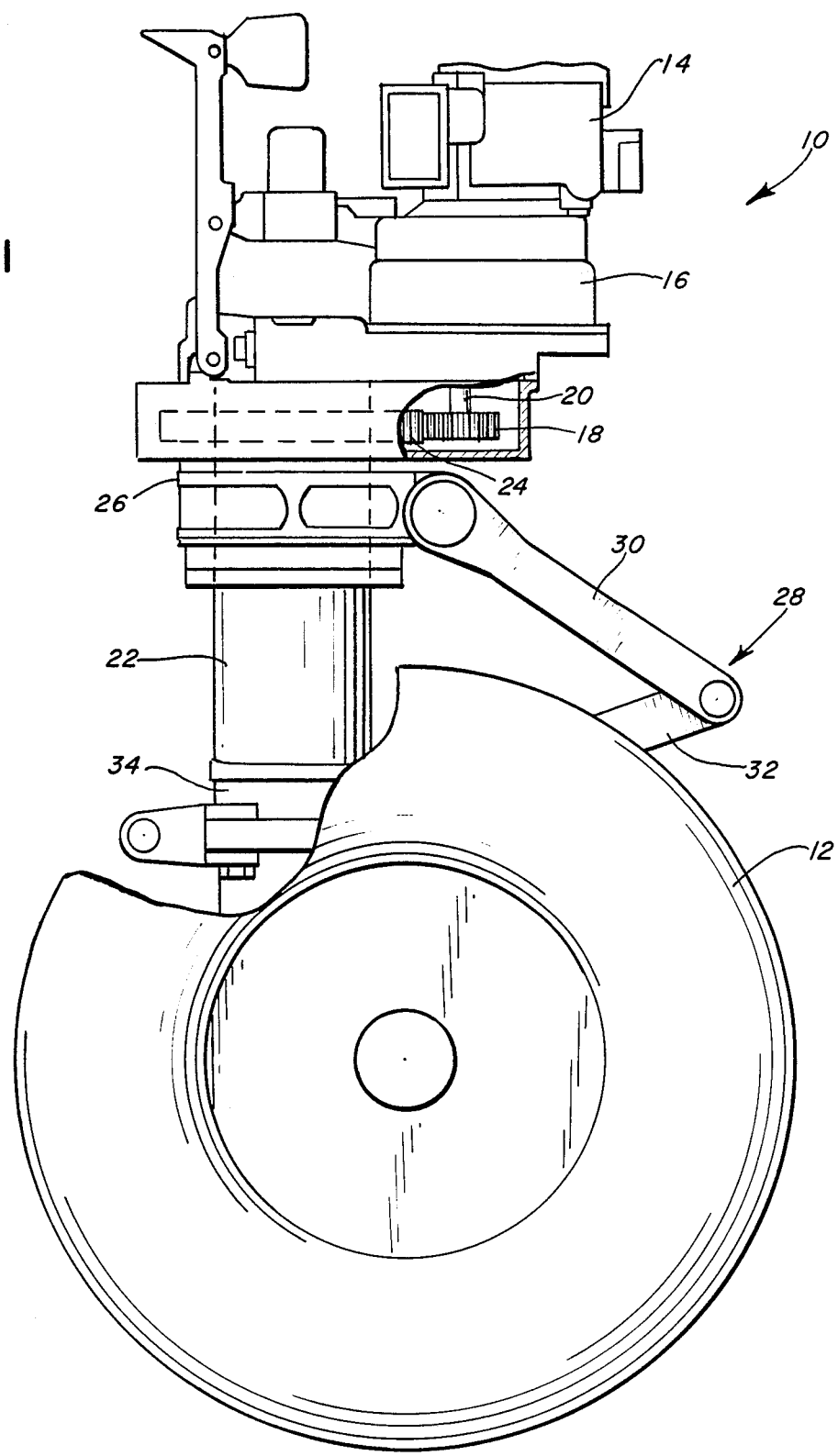
FIG. 1 is an elevation of an aircraft nosewheel illustrating the steering mechanism.

With reference to FIG. 1, an aircraft, not shown, typically includes a nosewheel steering system 10 to steer a nosewheel 12 of the aircraft.

The nosewheel steering system 10 includes a multipath power transmission in the form of multiple geartrains to provide power to in turn steer the nosewheel 12. The nosewheel steering system 10 receives the steering command at a power drive 14 from the controls, not shown, of the aircraft. The source of the steer command may be of any type known in the art and does not form any part of this invention.

The power drive 14 is coupled to a multipath power transmission, in the form of multiple geartrains, contained within a gear box 16. The multipath power transmission has a plurality of outputs with each output coupled to an output pinion 18 through an interconnecting shaft 20.

The power drive 14 and gear box 16 are mounted in a fixed position on a nose strut 22 of the aircraft. The nose strut 22 may be hingedly coupled to the aircraft, however, the nose strut 22 will not rotate about its axis.

The output pinions 18 mesh with a nosewheel gear 24. The nosewheel gear 24 is in turn coupled to an upper steering collar 26. The nosewheel gear 24 and the upper steering collar 26 are axially fixed and rotationally movable relative the nosewheel strut 22.

A knuckle arm 28 is pivotally attached to the upper steering collar 26. The knuckle arm 28 has an upper link 30 and a lower link 32 pivotally interconnected. The lower link 32 of the knuckle arm 28 is in turn pivotally attached to a lower steering collar 34. The lower steering collar 34 is also axially fixed and rotationally movable relative to the nosewheel strut 22.

Although not shown, the lower steering collar 34 is coupled to an axle 36. The axle is rotationally movable perpendicular to the axis of the nosewheel strut 22. One or more of the nosewheels 12 are mounted on the axle 36 by any known means.

In operation the power drive 14 receives a steer command from the pilot. The multipath power transmission in the gear box 16, as a result of this steer command, causes the output pinions 18 to rotate, thereby causing the nosewheel gear 24 to turn also. Any rotation of the nosewheel gear 24 is reflected by an associated movement in the upper steering collar 26, the knuckle arm 28 and the lower steering collar 34 about the nosewheel strut 22. As the lower steering collar 34 rotates, the nosewheel 12 also turns to steer the aircraft as commanded.

Figure 2:
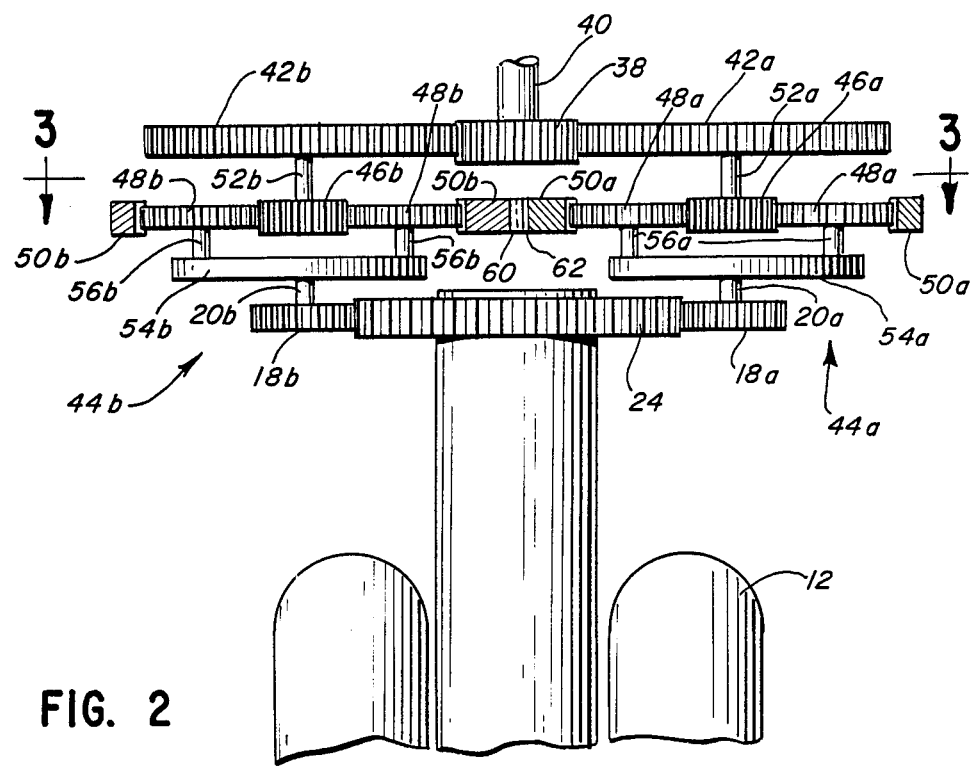
FIG. 2 is a somewhat schematic illustration of the geartrain arrangement of the present invention.

Referring now to FIG. 2, the multipath power transmission of the present invention is shown in detail.

An input gear 38 is coupled to the source of input power, in the form of the power drive 14, through an interconnecting shaft 40. The input gear 38 is meshed to a first and a second secondary input gear 42a and 42b. Each secondary input gear 42a and 42b is coupled to a respective first and second path in the multipath power transmission. In this embodiment the multipath power transmission is a dual path unit.

Since the components in each path of the multipath power transmission are alike in nature only those in one path will be discussed in detail. For clarity like numbers will indicate like components in each path with the letters a and b distinguishing between the first and second paths respectively.

The secondary input gear 42a drives a planetary gear set 44a. The planetary gear set 44a has a sun gear 46a a plurality of planet gears 48a and a ring gear 50a. The secondary input gear 42a is connected to the sun gear 46a by a shaft 52a.

Figure 3:
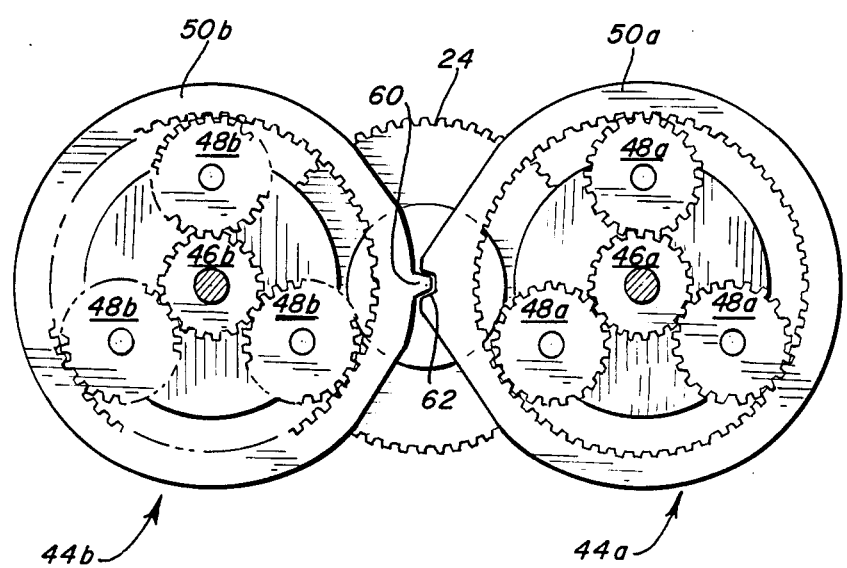
FIG. 3 is a sectional view taken along lines 3—3 of FIG. 2.

The relationship among the gears of the 2 planetary gear set 44a is shown more clearly in FIG. 3. The sun gear 46a is meshed with each of the planet gears 48a. Each of the planet gears 48a also engage the inner surface of the ring gear 50a. The theory of operation of a planetary gear set is known in the art and therefore will not be discussed in detail. Instead, those features of the planetary gear set 44a related to the instant invention will be set out in detail.

A carrier 54a is coupled to the planet gears 48a by corresponding shafts 56a. The carrier 54a is in turn interconnected to the output pinion 18a by the shaft 20a.

Referring now to FIG. 3, the ring gears 50a and 50b of the respective planetary gear sets 44a and 44b are shown interconnected to equalize the power provided to steer the nosewheel by each of the respective planetary gear sets 44a and 44b. This interconnection is provided by having the respective ring gears externally meshed through a wedging tooth 60 coupled to ring gear 50b and a wedging tooth notch 62 as part of ring gear 50a. The arrangement is such that as the ring gears 50a and 50b rotate from the position shown in either direction, such rotation will be progressively resisted by the increasing wedging force at the interface of the tooth 60 and notch 62.

To better understand the inventive concept an illustration describing the relationship among the gears will be discussed.

When the power drive 14 receives the steer command it turns the input gear 38 in, for example, the clockwise direction. This movement causes the secondary input gears 42a and 42b and the associated sun gears 46a and 46b to turn in a counterclockwise direction; the planet gears 48a and 48b to rotate in a clockwise direction; and each of the ring gears 50a and 50b to rotate in the clockwise direction.

Because the ring gears 50a and 50b are externally meshed it is impossible for them to both rotate in the clockwise direction. Initially, the ring gears 50a and 50b may rotate relative to one another against an increasing wedging force thereby tending to equalize power transmission through the gear sets 44a and 44b. When the resisting force prevents further relative rotation, power transmission is equalized and the ring gears 50a and 50b become stationary. This in turn means that manufacturing deficiencies have been compensated for.

With the ring gears 50a and 50b stationary, the planet gears 48a and 48b in addition to rotating, revolve about the respective sun gears 46a and 46b in a counterclockwise direction thereby causing their respective carriers 54a and 54b to also rotate in a counterclockwise direction. The output pinions 18a and 18b being coupled to the carriers 54a and 54b likewise rotate in a counterclockwise direction producing movement by the nosewheel gear 24 in the clockwise direction. The result being that the nosewheel itself turns in the clockwise direction.

It has been determined that when the ring gears are interconnected in an interference fit, and therefore remain stationary, the power provided by each planetary gear to steer the nosewheel is equivalent. Consequently, each of the respective planetary gear sets is only required to provide power for fifty percent of the rated load and may be sized accordingly. Limiting the load each gear set must drive permits the use of smaller and lighter components. In an aircraft this savings can be very important and beneficial.

We claim:

1. A multipath power transmission for providing power to a load, wherein the power transmitted by each path in the power transmission is balanced, comprising:
   a source of input power;
   an input gear coupled to the source of input power;
   a load to be driven;
   first and second geartrains in side-by-side relationship, each of the first and second geartrains interconnecting the input gear and the load to be driven;
   the first and second geartrains being driven by the source of input power through the input gear;
   the first and second geartrains together transmitting power to drive the load; and
   means independent of the input gear for movably but resistibly interconnecting the first and second geartrains to equalize the power provided to the load by each of said first and second geartrain.

2. The multipath power transmission defined by claim 1, wherein each of the first and second geartrains is a planetary gear set.

3. A multipath power transmission for providing power to a load, wherein the power transmitted by each path in the power transmission is balanced, comprising:
   a source of input power;
   an input gear coupled to the source of input power;
   a load to be driven;
   first and second geartrains in side-by-side relationship, each of the first and second geartrains interconnecting the input gear and the load to be driven;

the first and second geartrains being driven by the source of input power through the input gear;

the first and second geartrains together transmitting power to drive the load; and means for interconnecting the first and second gear trains to equalize the power provided to the load by each of said first and second geartrain, wherein each of the first and second geartrains is a planetary gear set having a ring gear and the interconnecting means includes the first and second planetary gear sets having their respective ring gears movably but resistibly coupled to one another.

4. A multipath power transmission for an aircraft nosewheel steering system, the multipath power transmission providing power to steer a nosewheel, wherein the power delivered by each path in the power transmission is balanced relative to the other, comprising:

a source of input power;

an input gear coupled to the source of input power;

a first and a second planetary gear set;

each of the first and the second planetary gear sets having a sun gear, at least one planet gear and a ring gear, with the sun gear in each planetary gear set meshed to its planet gear(s), the planet gear(s) in turn being meshed to the ring gear in the respective planetary gear set;

the input gear being meshed with the sun gears of both the first and the second planetary gear sets to provide power to each planetary gear set;

a first and a second output pinion, one for each planetary gear set;

each of the first and the second output pinions being coupled to the planet gear(s) of the first and second planetary gear sets, respectively;

a nosewheel gear coupled to the nosewheel to turn the nosewheel;

the first and second output pinions meshed to the nosewheel gear to in turn steer the nosewheel; and the first and second planetary gear sets having their respective ring gears movably but resistively coupled to one another to equalize the power provided by each planetary gear to steer the nosewheel.

5. The multipath power transmission defined by claim 4, wherein the first and second planetary gear sets have their respective ring gears externally meshed to equalize the power provided by each planetary gear set to steer the nosewheel and provide a reaction coupled, torque balanced geartrain.

6. A power system for the nosewheel steering of an aircraft, the power system providing the power to steer a nosewheel in the aircraft, comprising:

a source of input power;

an input gear coupled to the source of input power;

a first and a second planetary gear set;

each of the first and the second planetary gear sets having a sun gear, at least one planet gear and a ring gear, with the sun gear in each planetary gear meshed to its planet gear(s), the planet gear(s) in turn being meshed to the ring gear in the respective planetary gear set;

the input gear being meshed with the sun gears of both the first and the second planetary gear sets to provide power to each planetary gear set;

a first and a second output pinion, one for each planetary gear set;

each of the first and the second output pinions being coupled to the planet gear(s) of the first and second planetary gears, respectively;

a nosewheel gear;

the nosewheel gear coupled to the nosewheel to steer the nosewheel;

the first and second output pinions meshed to the nosewheel gear to in turn steer the nosewheel; and the first and second planetary gears having their respective ring gears externally meshed to equalize the power provided by each planetary gear to steer the nosewheel and provide a reaction coupled, torque balanced geartrain.

* * * * *